T. J. KEHOE.
CATCH FOR AUTOMOBILE HOODS.
APPLICATION FILED MAR. 4, 1914.
1,157,004.
Patented Oct. 19, 1915.
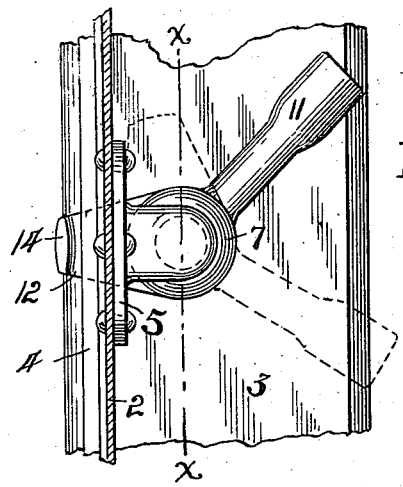
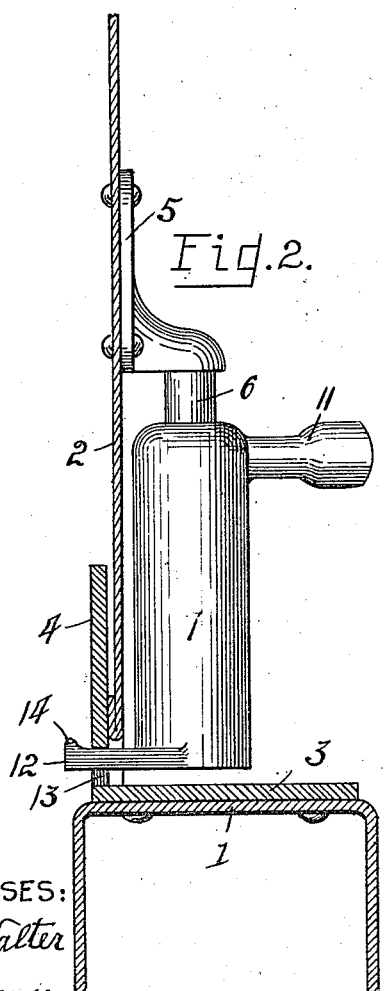
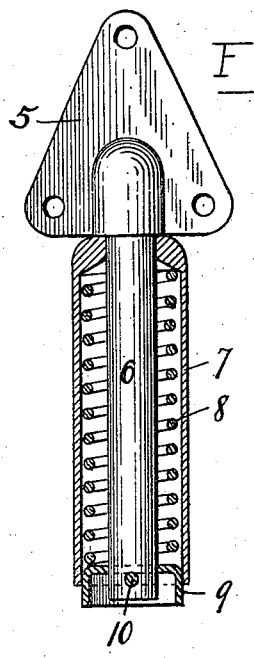
WITNESSES:
D. C. Walter
E. E. Thomas
INVENTOR.
Thomas J. Kehoe,
By Owen, Owen & Crampton,
His attys

UNITED STATES PATENT OFFICE.

THOMAS J. KEHOE, OF TOLEDO, OHIO.

CATCH FOR AUTOMOBILE-HOODS.

1,157,004. Specification of Letters Patent. Patented Oct. 19, 1915.

Application filed March 4, 1914. Serial No. 822,326.

*To all whom it may concern:*

Be it known that I, THOMAS J. KEHOE, a citizen of the United States, and a resident of Toledo, in the county of Lucas and State of Ohio, have invented a certain new and useful Catch for Automobile-Hoods; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates particularly to catches or fastening means for the sides of automobile hoods to releasably retain such sides in closed position, but is not restricted to such use as it may be used in any connection for which it may be appropriate.

The object of my invention is the provision of an improved fastening means of the character described, which is simple, strong and durable in its construction, capable of being easily and quickly operated to fasten or release a side of a hood, and is also yieldable in its nature to compensate for wear, and to yieldingly join the connected parts to prevent rattling and other free relative movements thereof.

A further object of my invention is the provision of a device of this character, which, in addition to serving as a catch member for attaching a side of a hood to a fixed portion of an automobile frame, also serves as a handle by means of which the raising and lowering movements of the hood side may be controlled.

Further objects and advantages of the invention will be apparent from the following detailed description thereof.

The invention is fully described in the following specification, and while, in its broader aspect, it is capable of embodiment in numerous forms, a preferred embodiment thereof is illustrated in the accompanying drawings, in which,—

Figure 1 is a plan view of portions of a hood side and adjacent sill-strip with my invention associated therewith and in locked position. Fig. 2 is a side elevation thereof with the hood side and sill-strip in section, and Fig. 3 is an inner side elevation of the catch member with a part thereof in central longitudinal section.

Referring to the drawings, 1 designates a side bar of an automobile chassis, 2 a side portion of an associated hood, and 3 a sill-strip, one of which is fixedly mounted on a bar 1 at each side of the hood and is provided at its inner end with an upstanding flange 4 against the outer side of which the lower edge of the adjacent hood side is intended to bear, as indicated.

The catch embodying my invention comprises a bracket member 5, which is riveted or otherwise suitably fixed to the outer side of the hood 2 adjacent to its lower edge and has a stud or stem 6 projecting downward therefrom in substantially parallel spaced relation to the hood side and terminating at its lower end near the lower edge of the hood side, as best shown in Fig. 2.

A barrel or shell of substantially cylindrical form is mounted on the stem 6 for free longitudinal movements thereon, and has its opening or interior of greater diameter than the stem to provide a space therebetween in which a coiled compression spring 8 is disposed. The upper end of the barrel 7 is contracted to form a bearing for the stem 6, in register with the longitudinal axis of the barrel, and to form a part for opposing the thrust of one end of the spring 8.

The barrel 7 is approximately the same length as the stem 6 and is centralized at its lower open end relative to the stem by a plunger part 9, which fits within the barrel for free reciprocatory movements therein, and has a central opening for receiving the stem 6. The plunger 9 receives the outer end thrust of the spring 8 and is retained on the stem by a pin 10 which is inserted through an opening in the outer end portion of the stem, and is of sufficient length for its ends to project beyond the respective sides of the stem in position to receive the outward spring-influenced thrust of the plunger. It is preferable to make the plunger 9 of cup-shape, as shown, so that the bearing contact with the washer against the wall of the barrel 7 will not only be broadened, but the pin 10 prevented from removal from the stem when its ends are in register with the side flange of the plunger. It is thus evident that to remove the pin 10 it is necessary to move the plunger inward on the stem 6 a sufficient distance to move the side flange thereof out of register with the pin 10. When this is done the pin can be freely removed.

The barrel 7 is provided preferably at or near its upper end with a laterally projecting handle part 11, and at its lower end with a laterally projecting finger 12, which handle part and finger preferably project in substantially opposite directions from the barrel. The finger 12 is intended to be projected inward under the lower edge of the adjacent hood side 2 and through a registering opening 13 in the sill flange 4, and is provided on the upper side of its free end with a lip or flange 14 for preventing an accidental withdrawal of the finger from the opening by reason of shocks, frame vibration, or the like. The opening 13 is so disposed with relation to the finger 12, when the adjacent hood side 2 is in closed position and the barrel 7 is in its normal position, as to require a depression of the barrel 7 relative to the stem 6 and against the tension of the spring 8 in order to place the finger 12 and opening 13 in register, thus causing the finger when inserted through the opening and bearing upward against the top wall thereof to exert a downward pulling force through the barrel 7, spring 8 and stem 6 on the attached hood side.

When the finger is lowered in register with an opening 13 it is moved therein by a partial turning movement of the barrel, substantially a quarter turn being required to place the finger into and out of engagement with the opening, as indicated in Fig. 1. It is preferable to have the control arm 11 form an oblique angle with the finger 12, as indicated in Fig. 1, so that when the finger is in locked or released relation to the sill flange 4 the control arm 11 will stand at one side or the other of a plane disposed longitudinally of the barrel and at right angles to said flange, as indicated in Fig. 1.

It is evident that any desired numer of catch means forming my invention may be employed at each side of the hood, and also that the same may be easily and quickly placed in engagement with or released from the sill flange 4 by pressing downward on the control handles 11 and then turning the same in the desired direction.

I wish it understood that my invention is not limited to any specific construction, arrangement or form of the parts as numerous modifications of the same may be made within the scope of the invention.

Having thus described my invention, what I claim as new, and desire to secure by Letters Patent, is,—

1. The combination with a fixed part and a part movable relative thereto, said fixed part having an opening therein, of a stem carried by the movable part, a member mounted for rotary and yielding axial movements on said stem and having a control handle, and a catch finger projecting from opposite side thereof, the catch finger being adapted to project into said fixed part opening and to coöperate therewith to retain the parts in rigid relation.

2. The combination with an automobile hood and a sill strip, said strip having an opening therein, of a bracket carried by a side of the hood and having a stem disposed in spaced relation to the hood and projecting toward the adjacent free edge thereof, and a member mounted for rotary and yielding axial movements on said stem and having a catch finger for insertion within the sill strip opening when in register therewith.

3. The combination with a sill strip having an upstanding flange provided with an opening, and a hood having a side edge lapping said flange, of a stem carried by a side of the hood in spaced substantially parallel relation thereto and projecting to adjacent its lower edge, a member mounted for rotary and axial movements on said stem and having a catch finger and a control handle projecting from opposite sides thereof, the finger being adapted to project within said flange opening, and means resisting an axial movement of the member in one direction on the stem.

4. A catch comprising a bracket part having a stem projecting therefrom, a cylindrical member mounted on said stem and having one end contracted and forming a bearing around the stem, a plunger carried by the stem for working within the outer end of said member, a coiled compression spring encircling the stem within said member and having its opposite ends thrust against the contracted end of the member and said plunger, and a catch finger projecting laterally from said member.

5. The combination with a fixed part having a catch opening therein, and a part which is movable with respect to said fixed part, of a bracket fixed to said movable part in spaced relation to an edge thereof and having a stem which projects toward the adjacent edge of the movable part in spaced substantially parallel relation to said part, a barrel mounted for longitudinal reciprocatory movements on said stem and having its bore larger than said stem and having the end thereof which is adjacent to the bracket contracted to fit the stem for sliding and turning movements thereon, said barrel having a lever member projecting transversely from one end portion thereof, and a tongue projecting transversely from the opposite end portion thereof, said tongue being normally disposed in spaced relation to the opening in said stationary part and movable into register with said opening by lengthwise movements of the barrel on said stem and into said opening by turning movements of the barrel on said stem, a coiled compression spring encircling the stem within said barrel and a plunger part removably carried at the outer end of said stem for movement into the barrel and for receiving the outer end thrust of said spring.

In testimony whereof, I have hereunto signed my name to this specification in the presence of two subscribing witnesses.

THOMAS J. KEHOE.

Witnesses:
P. D. WAGNER,
E. E. THOMAS.